Aug. 15, 1967   R. SHERMAN   3,335,978
ATTITUDE ANTICIPATOR
Filed Nov. 10, 1965   2 Sheets-Sheet 1

INVENTOR
ROBERT SHERMAN
BY Norman Friedland
ATTORNEY

Aug. 15, 1967  R. SHERMAN  3,335,978
ATTITUDE ANTICIPATOR
Filed Nov. 10, 1965  2 Sheets-Sheet 2

United States Patent Office 3,335,978
Patented Aug. 15, 1967

3,335,978
ATTITUDE ANTICIPATOR
Robert Sherman, West Hartford, Conn., assignor to United Aircraft Corporation, East Hartford, Conn., a corporation of Delaware
Filed Nov. 10, 1965, Ser. No. 507,132
6 Claims. (Cl. 244—53)

ABSTRACT OF THE DISCLOSURE

For an air inlet in a supersonic aircraft which inlet includes a movable spike or bypass doors or both, means for varying the geometry of the inlet in response to the rate of change of attitude including a valve in a line which has a flow therethrough at a rate proportional to the rate of change of attitude, which valve translates when the flow rate is above a predetermined limit. When the valve translates, hydraulic signal lines which control the movable spike and a bypass system are vented to drain through appropriate orifices. The spike is thereby caused to move a predetermined amount and the bypass to open a predetermined amount, thus effecting a step change in the inlet to prevent expulsion of the normal shock.

This invention relates to air inlet controls for supersonic aircraft and in particular to an attitude anticipator for preventing unstarting of an internal compression inlet when the attitude of the aircraft is suddenly changed.

Under optimum operating conditions of a variable geometry air inlet system for supersonic aircraft, a normal shock wave is located slightly downstream of the throat of the inlet. During sudden changes in aerodynamic conditions at the inlet or in the engine operating characteristics, there may be a strong tendency for the inlet to become unstarted. When the inlet is unstarted the normal shock wave is located at the lip of the inlet rather than at the throat. In this condition the efficiency of the inlet is drastically reduced and the powerplant output decreases very suddenly. The movement of the shock wave to the lip of the inlet causes spillage of air around the inlet which results in an extreme change in the aerodynamic profile of the aircraft in the vicinity of the inlet. The combined effect of these factors can result in a severe stability problem in the aircraft.

One important cause of unstarts, especially in military aircraft, is a sudden change in the attitude of the aircraft because of maneuvers or the loss of one or more engines. If the attitude sensing system of the air inlet control is made fast enough to handle the maximum anticipated transients, it is probable that the system will be subject to stability problems. To overcome this and to prevent unstarts, I propose to add an attitude anticipator system to the normal attitude sensing system of an air inlet control to anticipate expulsion of the normal shock when the attitude of the aircraft is suddenly changed and adjust the inlet geometry and bypass to prevent this expulsion. The attitude anticipator overrides normal control functions and allows the use of a slower and more stable air inlet control system while preventing unstarts due to sudden changes in aircraft attitude.

In accordance with this invention, attitude anticipation is accomplished by making step changes in the inlet controls when the rate of change of attitude exceeds a preset limit.

The specific embodiment shown in this application is an improvement to the air inlet system which is disclosed in Patent No. 3,181,817, issued to M. Marcus et al. on May 4, 1965, and Patent No. 3,172,622, issued to P. Kalika et al. on Mar. 9, 1965.

Generally, my invention works as follows: A switching valve is incorporated in an existing flow line which has a flow rate proportional to the rate of change in attitude. A flow rate above a preset limit causes the valve to translate and vent to drain, through appropriate orifices, hydraulic signal lines which control a movable spike and a bypass system. This causes the spike to advance a predetermined amount and the bypass to open a predetermined amount, thus effecting a step change in the inlet to anticipate a tendency for the shock to be expelled.

It is an object of this invention to provide a rate of change of attitude anticipator in an air inlet control.

It is a further object of this invention to provide an air inlet control capable of anticipating the expulsion of a normal shock caused by sudden changes in the attitude of the aircraft.

It is a further object of this invention to provide an air inlet control which is responsive to a rate of change of attitude above a preset limit.

It is a further object of this invention to provide an air inlet control which will make step changes in inlet geometry and the bypass position in response to rapid changes in attitude.

It is a further object of this invention to provide an air inlet control which has a stable attitude sensing system and which also is capable of handling rapid changes in attitude without causing an unstart of the inlet.

It is a further object of this invention to provide an attitude anticipator which will override the normal functioning of the air inlet control when the rate of change of attitude increases beyond a preset limit and reposition the inlet geometry to correct for anticipated changes in the normal shock position.

As stated above, this invention is an improvement over an air inlet control system disclosed in the patents issued to M. Marcus et al. and to P. Kalika et al., supra. The reader is directed to these patents for a complete description of this air inlet control and its operation. I have shown here only those parts of the control which are essential to the understanding of my invention.

Figure 1:
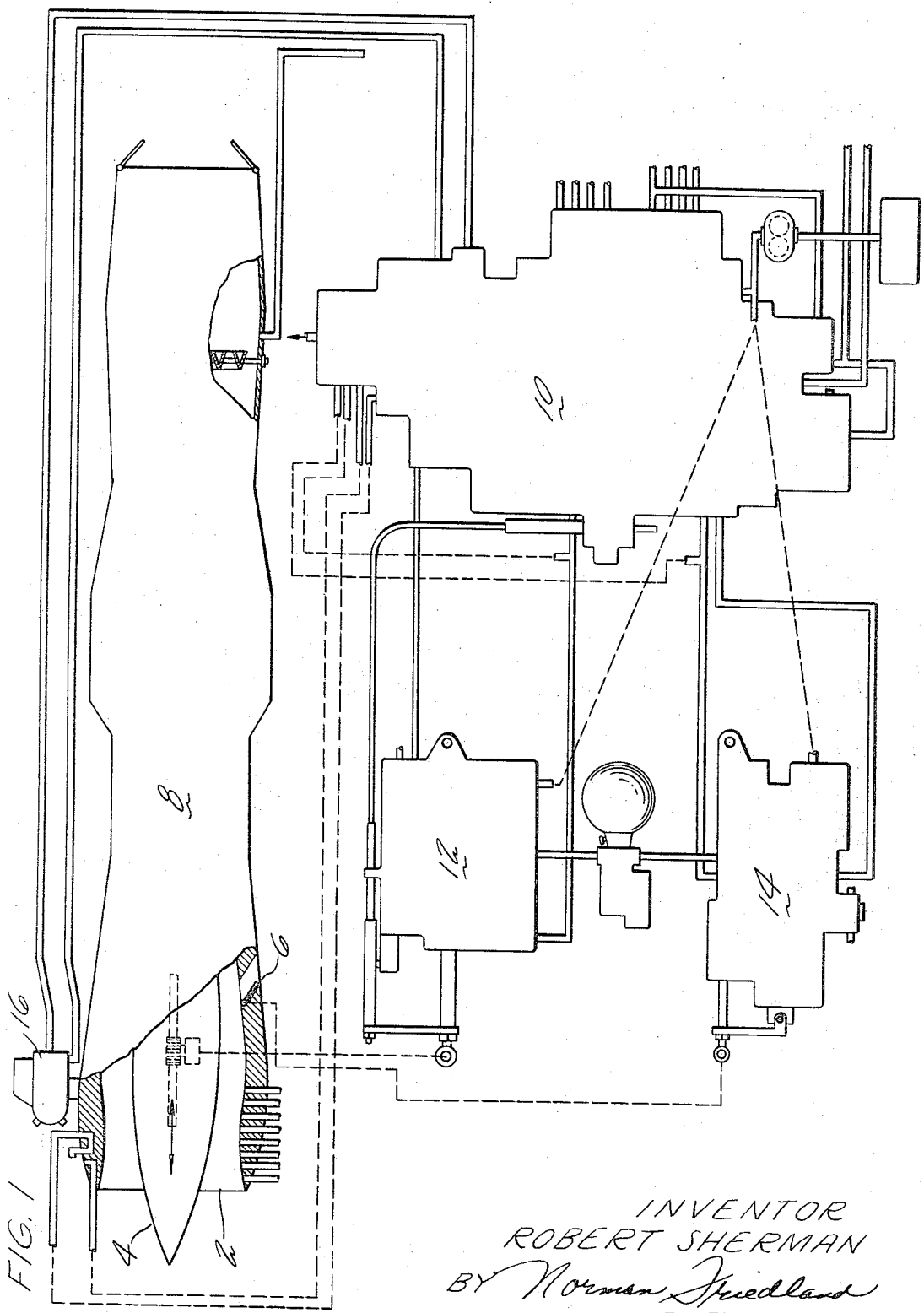
FIGURE 1 is a general schematic showing a variable geometry air inlet and the associated controls and sensing devices.

FIGURE 1 shows an air inlet generally indicated by numeral 2 having an axially movable spike 4 for varying the geometry of the inlet, and a bypass door 6 for bypassing excess air which is taken into the inlet but not required for engine operation. The inlet provides air for the air breathing powerplant 8.

The control system consists of a main control generally indicated by numeral 10, a spike actuator generally indicated by numeral 12 and a bypass actuator generally indicated by numeral 14. The main control 10 senses a plurality of parameters and controls both actuators so as to provide an optimum inlet geometry and bypass position.

An attitude Pitot probe 16 is mounted on the airframe and provides control signals which are a function of the angle formed by the centerline of the inlet and the free airstream. This angle will change when the angle of attack or angle of yaw of the aircraft is changed but not when the angle of roll is changed.

Figure 2:
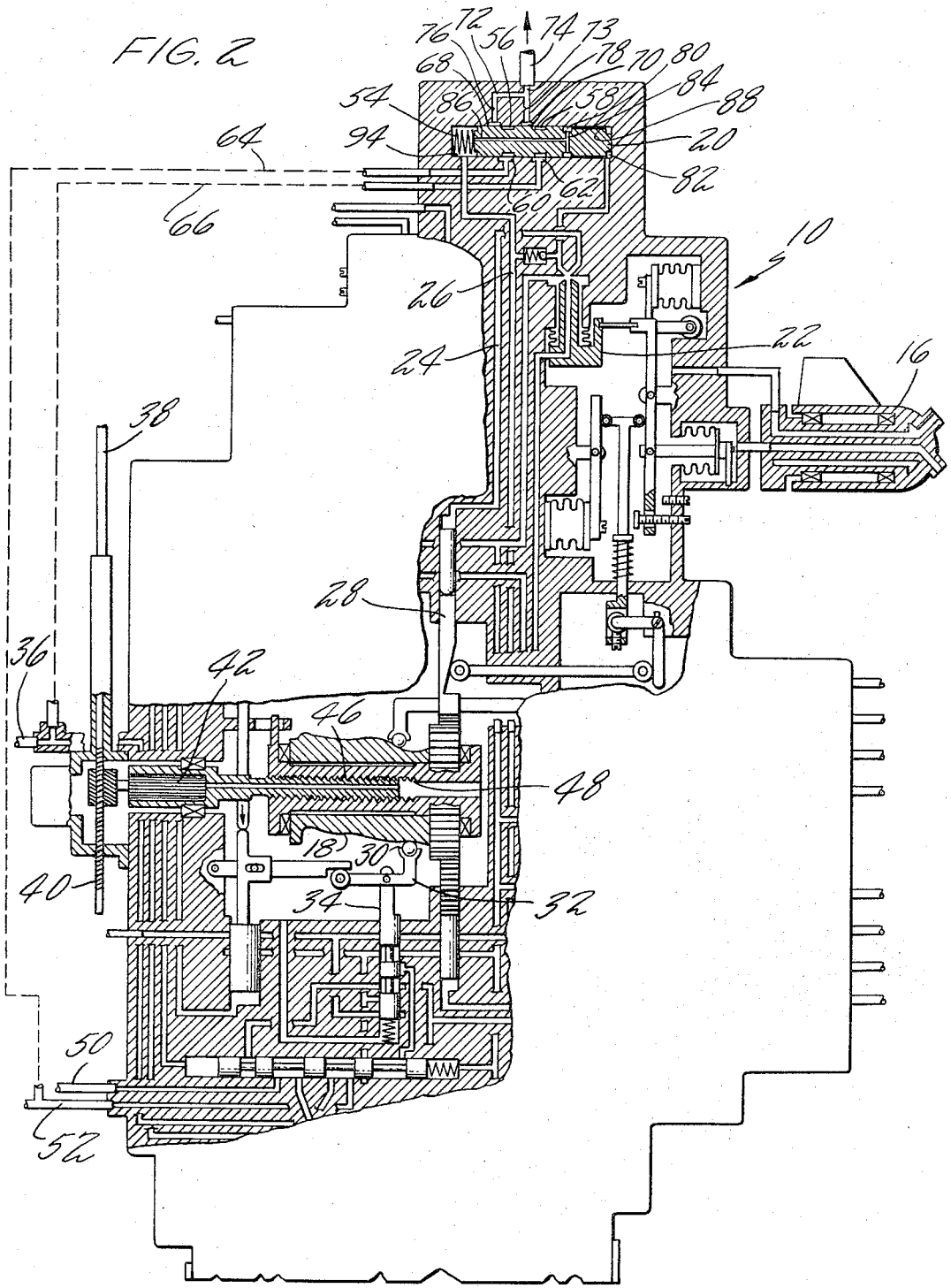
FIGURE 2 is a schematic representation of the controls shown in FIGURE 1.

FIGURE 2 shows an enlarged partial view of the main control shown in FIGURE 1. Except for the switching valve generally indicated by numeral 20 and its associated flow passages, the control is identical to the control described in detail in the aforementioned Marcus et al. and Kalika et al. patents. The control 10 schedules the position of the spike and the bypass by moving three-dimensional cam 18 which is simultaneously movable axially and rotatably in response to the actual position of the spike and the attitude of the inlet respectively. The control also senses the local Mach number, compares actual local Mach number with the three-dimensional cam output, and positions the spike as a function thereof. Also, another output of the three-dimensional cam positions the normal shock in its optimum position, and the control utilizes this shock position signal to position the bypass. Therefore, it can be seen that the position of the bypass and spike which are scheduled by the cam, are scheduled as a function of the local Mach number, actual spike position and attitude. The control can then be viewed as a device which senses a plurality of inlet conditions or variables and uses these variables for generating signals in order to schedule the position of the bypass and spike.

During normal operation of the control when there are no sudden changes in attitude, the switching valve 20 is spring loaded to the right-hand side of its bore. The three-dimensional cam 18 is rotated as a function of changes in attitude and has a unique steady state rotational position for each value of the attitude signal. During changes in attitude, the jet pipe valve 22 serves to move the attitude servo piston 28 by directing high pressure fluid through passages 24 or 26. The movement of the jet pipe valve 22 and consequently the amount of flow in lines 24 or 26 is proportional to the magnitude of the change in the attitude signal. Therefore, it is seen that the rate of flow in lines 24 and 26 is indicative of the rate of change of attitude.

A predetermined schedule of spike position is imposed on the surface of the three-dimensional cam. The lever 32 which is attached to valve 34 picks up this schedule through roller 30. A second signal indicative of the local Mach number is transmitted to the left side of lever 32 so that the position of the valve 34 is proportional to the difference between the local Mach number and the scheduled local Mach number based on spike position and attitude. A signal proportional to the displacement of valve 34 is transmitted through line 36 to the spike actuator 12. As the spike is moved in accordance with this signal, a spike position feedback cable 38, which follows the position of the spike, carries a spline arrangement 40 for rotating member 42. Member 42 carries screw thread 46 which mates with internal thread 48 of the three-dimensional cam 18. Rotation of member 42 causes translation of cam 18. As the cam is translated, it repositions the lever 32 so that the valve 34 is returned to its line-on-line or steady state position.

During normal operation of the control, the normal shock position is scheduled by the 3–D cam so as to be located just downstream of the throat of the diffuser. The main control compares the desired shock position, which is a function of inlet geometry and therefore of the position of cam 18, with the actual shock position. An error signal which is proportional to the difference between these values is transmitted to the bypass actuator via lines 50 and 52. The bypass actuator causes the bypass door to move in a direction which will cause the normal shock to move towards its scheduled position. When the normal shock reaches the scheduled position, the error signal is reduced to zero and the system is in an equilibrium position.

The air inlet control described above being known in the art, reference is now made to the switching valve 20 and the accompanying hydraulic circuitry which comprises one embodiment of my invention, and which is shown in detail at the top of FIGURE 2. The switching valve 20 is spring loaded to the right by spring 54. In this position annuli 56 and 58 in the valve register with ports 60 and 62, which are connected to lines 64 and 66, respectively. Line 66 is connected to the spike actuator signal line 36 while line 64 is connected to bypass actuator line 52. Ports 68 and 70 are connected to the low pressure drain via lines 72, 73 and 74. Lines 72 and 73 contain adjustable orifices 76 and 78. Ports 68 and 70 are axially spaced from their cooperating ports 60 and 62 so that there is no flow between these ports when the valve is in the right-hand position. The diameter of the valve from annulus 80 to chamber 82 is slightly smaller than the diameter of the bore so as to provide a restricted flow path from chamber 82 to annulus 80. Drilled passages 84 and 86 connect annulus 80 with chamber 94. The valve is located in line 26 which is one leg of the flow path from the jet pipe valve 22 to the attitude servo piston 28. The flow in this line is from the jet pipe valve to the servo when the angle formed by the centerline of the spike and the free airstream is increasing.

OPERATION

When the jet pipe valve rotates clockwise in response to an increase in the angle between the centerline of the spike and the free airstream, a stream of high pressure fluid is directed to line 26. The movement of the jet pipe valve, and consequently, the flow in line 26, is proportional to the rate of the change in this angle. The fluid flows into chamber 82 and along the restrictive annular path 88 to annulus 80 and then through drilled passage 84 and 86 into line 26 to the attitude servo piston 28. The restrictive annular path 88 causes a pressure drop between chamber 82 and chamber 94 which is roughly proportional to the flow rate. The pressure drop multiplied by the end area of the valve tends to move the valve to the left against the force of spring 54. Above a preset limit of flow the force caused by the pressure drop will overcome the preload on spring 54 and translate the valve to the left. As the valve moves to the left, lines 64 and 66 become connected to drain through annuli 56 and 58 and lines 72 and 73. The metered flow in lines 36 and 52 are drained at a predetermined rate through the orifices 76 and 78.

The drain on line 36 acts as a false error signal in the spike control system. Reduction of the pressure in line 36 causes the spike to move toward the extended position. The spike feedback cable causes the three-dimensional cam to be translated. As the axial position of the three-dimensional cam, which is indicative of spike position, is changed, the spike control valve 34 moves downward to increase the flow in line 36. The valve will move until the flow into line 36 from valve 34 is equal to the rate of flow being bled out of line 36 through the switch valve 20 at which time the spike will stop moving. Because of the mechanical feedback through the spike position feedback cable, the spike will advance an amount determined by the size of restrictor 78. The sizing of this restrictor is determined by the amount of spike motion necessary for the limit to cope with extreme attitude transients without becoming unstarted.

Bleeding of line 52 through restrictor 76 acts upon the bypass system in a manner similar to the spike system so as to open the bypass door. There is no direct mechanical feedback between the bypass door position and the main control as in the spike system. The main control generates an error signal which is proportional to the difference between the scheduled shock position and the actual shock position. The bypass actuator causes the bypass doors to move, thus moving the shock in the desired direction. As the shock moves, the error signal to the bypass decreases until the shock is in its scheduled position at which time the error signal to the bypass is zero and the pressure in line 52 is equal to the pressure in line 50. This feedback system is indirect inasmuch as the bypass moves the shock which determines the error signal. When the switching valve bleeds line 52, a false error signal is introduced into the bypass system. The bypass doors move in response to this signal causing the shock to move downstream. The bypass doors continue to open and shock continues to move until the error signal generated by the main control is equal to the false error signal being introduced into line 52. At this time the pressures in line 50 and 52 will be equal and the bypass door will stop moving.

It will be appreciated by one skilled in the art that my invention could be used in other type of variable geometry inlet controls including some applications in which the switching valve might control only the variable geometry inlet and not a bypass system. Therefore, it should be understood by those skilled in the art that various changes and omissions in form and detail thereof may be made therein without departing from the spirit and scope of the invention, which is to be limited only as set forth in the following claims.

What I claim as new and desire to secure by Letters Patent of the United States is:

1. In an air inlet system for supersonic aircraft, the combination of an air inlet duct having a variable geometry, means for controlling said variable geometry duct and means for varying the geometry of said inlet duct in response to the rate of change of aircraft attitude with respect to the free airstream.

2. In an air inlet system for supersonic aircraft, the combination of an air inlet duct having a variable geometry, means for controlling said variable geometry duct including means responsive to the rate of change of attitude of said aircraft for varying the geometry of said inlet duct a predetermined amount when the rate of change of aircraft attitude with respect to the free airstream in an increasing direction exceeds a preset limit.

3. An air inlet system for supersonic aircraft comprising an air inlet having a variable geometry, a bypass downstream of said inlet for diverting excess air received by said inlet, control means for regulating said variable geometry inlet and said bypass doors including means responsive to the rate of change of aircraft attitude with respect to the free airstream for opening the bypass and varying the geometry of said inlet.

4. A system as defined in claim 3 wherein said means responsive to the rate of change of aircraft attitude is effective to open said bypass and vary the geometry of said inlet duct by predetermined amount when the rate of change of attitude exceeds a preset limit.

5. An air inlet system for a supersonic aircraft powerplant having a variable geometry air inlet duct and a bypass downstream of said duct adapted to divert excess air received by the inlet duct which is not required by the powerplant, a control for regulating said variable geometry inlet duct and said bypass comprising: means for controlling said duct geometry and said bypass in response to aerodynamic conditions at the inlet and to powerplant requirements, and means responsive to the rate of change of attitude of the aircraft with respect to the free airstream for opening the bypass and varying the geometry of said inlet duct by predetermined amounts when the rate of change of attitude exceeds a preset limit.

6. An air inlet system for a supersonic aircraft powerplant comprising: an air inlet duct having a variable geometry, a bypass downstream of said inlet duct adapted to divert excess air which is not required by the powerplant and a control for regulating said variable geometry duct and said bypass in accordance with aerodynamic conditions at the inlet and powerplant requirements, said control including means for sensing changes in the attitude of said air inlet duct with respect to the free airstream and means responsive to said sensing means for opening said bypass and varying the geometry of said inlet by predetermined amounts when the rate of change of attitude exceeds a preset limit.

References Cited

UNITED STATES PATENTS

| | | | |
|---|---|---|---|
| 2,776,806 | 1/1957 | Brendal | 244—53 |
| 2,932,945 | 4/1960 | Brandt | 244—53 X |
| 2,969,939 | 1/1961 | Svlkin et al. | 244—53 |
| 2,997,843 | 8/1961 | Arnett et al. | 244—53 |
| 3,046,729 | 7/1962 | Petren | 244—53 |
| 3,181,817 | 5/1965 | Marcus et al. | 244—53 |

MILTON BUCHLER, *Primary Examiner.*

B. BELKIN, *Assistant Examiner.*